United States Patent [19]

Bleich et al.

[11] Patent Number: 4,570,158
[45] Date of Patent: Feb. 11, 1986

[54] HORIZONTAL AND VERTICAL IMAGE INVERSION CIRCUIT FOR A VIDEO DISPLAY

[75] Inventors: Charles R. Bleich, Elk Grove Village; Eugene P. Jarvis, Chicago; Walter E. Smolucha, Melrose Park, all of Ill.

[73] Assignee: Williams Electronics, Inc., Chicago, Ill.

[21] Appl. No.: 562,039

[22] Filed: Dec. 15, 1983

Related U.S. Application Data

[63] Continuation of Ser. No. 315,497, Oct. 27, 1981, abandoned.

[51] Int. Cl.4 .............................................. G09G 1/16
[52] U.S. Cl. ..................................... 340/727; 340/750; 340/723
[58] Field of Search ............... 340/727, 723, 724, 750, 340/747, 721

[56] References Cited

U.S. PATENT DOCUMENTS

| | | | |
|---|---|---|---|
| 3,777,059 | 12/1973 | Wilkey, Jr. ......................... | 340/717 |
| 3,976,982 | 8/1976 | Eiselen .............................. | 340/723 |
| 4,168,488 | 9/1979 | Evans ................................ | 340/727 |
| 4,271,476 | 6/1981 | Lotspeich ......................... | 340/727 |
| 4,323,981 | 4/1982 | Akashi .............................. | 340/750 |
| 4,326,201 | 4/1982 | Enokizono ....................... | 340/750 |
| 4,486,745 | 12/1984 | Konno ............................... | 340/734 |

Primary Examiner—Marshall M. Curtis
Attorney, Agent, or Firm—McDougall, Hersh & Scott

[57] ABSTRACT

A video display system is provided for a video game or the like including a computer, a CRT, and mechanism for displaying images on the CRT under control of the computer. An image memory receives image data from the computer for subsequent display on the CRT. A mechanism causes the image data to be written into the image memory in one of two selectable modes, namely, left to right or right to left. Another mechanism causes the image data to be read from the memory for subsequent display on said CRT in one of two modes, namely, top to bottom or bottom to top. A mechanism controls the selection of the writing and reading modes wherein the image displayed on the CRT may be normal or inverted when viewed from a fixed position.

7 Claims, 2 Drawing Figures

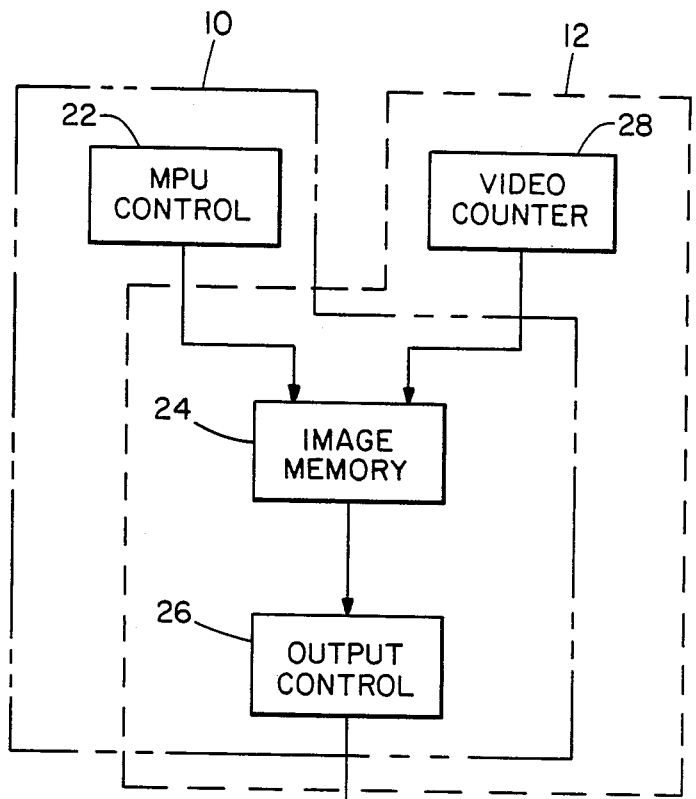
FIG.1
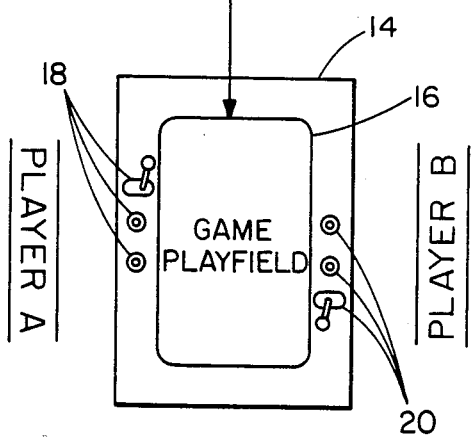

HORIZONTAL AND VERTICAL IMAGE INVERSION CIRCUIT FOR A VIDEO DISPLAY

This application is a continuation, of application Ser. No. 315,497, filed 10/27/81, now abandoned.

BACKGROUND OF THE INVENTION

This invention relates generally to a device for inverting or "flipping" the image displayed on the screen of a cathode-ray tube (CRT). This invention has particular, but not exclusive, application to video games or the like.

In one type of video game which is built in the form of a table, a CRT is recessed within the center of the table. The screen of the CRT points upwardly and is parallel to the horizontal surface of the table. Typically player operable controls are disposed on opposite sides of the table so that two players sitting opposite each other can play a video game displayed upon the horizontally oriented screen of the CRT.

It is desirable that each of the players be allowed to take turns playing the same video game. Since player "B" sits opposite player "A" he would observe the picture displayed to player "A" as being inverted. In order to display the same image in proper orientation for player "B", the image must be inverted, that is, the image must be top to bottom and left to right transposed.

It is an object of the present invention to provide an apparatus for inverting a computer generated image on the screen of a CRT so that the same software or program used to generate the normal image is also used to generate the inverted image.

Although the invention itself is set forth in the claims appended hereto, an understanding of the construction and use of an embodiment thereof may be had by reference to the detailed description taken in conjunction with the drawings in which:

FIG. 1 is a general block diagram of a video game display system;

DETAILED DESCRIPTION

Figure 2:
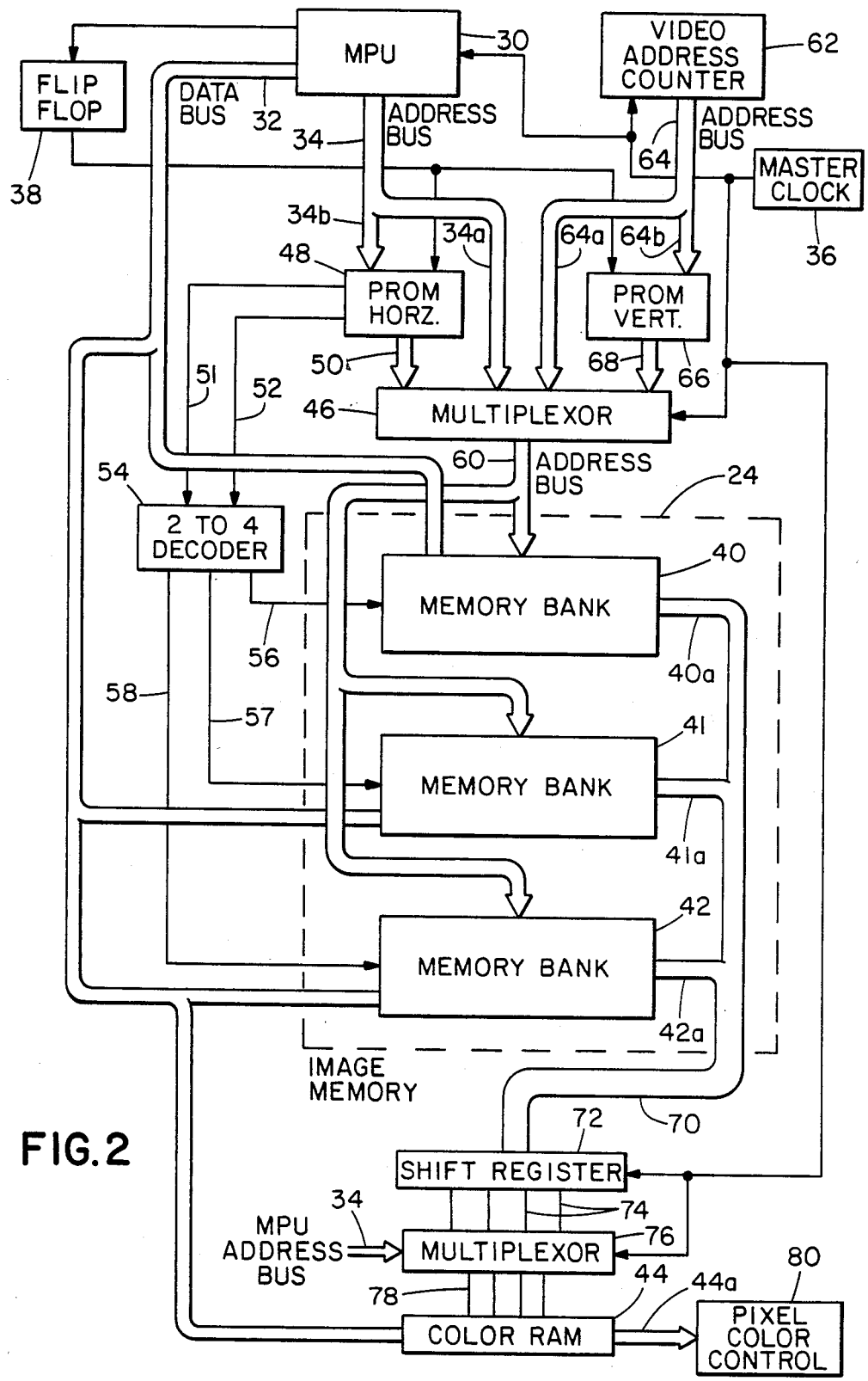
FIG. 2 is a more detailed block diagram of the system shown in FIG. 1 which incorporates an embodiment of the present invention.

Although the embodiment of the present invention is described below with reference to a video game, it will be understood that the present invention is generally suited to any video display system in which image inversion is desired.

FIG. 1 generally illustrates a video game system having a computer control section 10, a video scanning section 12, and a cabinet or table 14 which houses a horizontally disposed CRT 16 as well as all elements of the video game including sections 10 and 12. Opposing players "A" and "B" each have player operable controls 18 and 20, respectively. It will be apparent that the message "GAME PLAYFIELD" is properly displayed to player A but is inverted from player B's perspective, i.e. requires a top to bottom (vertical) transposition and a left to right (horizontal) transposition to be properly displayed for player B.

Computer control section 10 includes microprocessor (MPU) control 22, image memory 24 and output control 26. The microprocessor and associated software control the video game program and generate image data which is utilized to define the image displayed by the CRT. Image memory 24 is a random access memory having the capacity to store an image word generated by the microprocessor for each of the pixels on the screen of the CRT.

The video scanning section 12 utilizes a video counter 28 to generate addresses which scan the image memory. The output of the memory, as scanned by the video counter, is coupled to output control 26. The output control shifts the image words stored in the image memory in proper output synchronization to control the color and intensity of each pixel on the screen of CRT 16. The image memory and output control are common to both the computer control section 10 and video scanning section 12. However, the video counter 28 is independent of the control of the microprocessor so that the scanning of the image memory is independent of the writing of data in the image memory by the microprocessor 22. One complete scanning of the image memory by the video counter corresponds to one complete scanning of the screen of the CRT.

FIG. 2 illustrates a more detailed block diagram of computer section 10 and video scan section 12. Microprocessor 30 has a data bus 32, an address bus 34, and utilizes an external clock source provided by master clock 36. The microprocessor sets and resets flip-flop 38 which provides a means for selecting whether the displayed image will be normal or inverted. The MPU data bus 32 is connected to memory banks 40, 41 and 42 which define the image memory 24 and is connected to the color ram 44 whose function will be described below. By means of data bus 32, the MPU writes and rewrites the data stored in the memory banks.

Address bus 34 is divided into a first set of lines 34a which is coupled directly to multiplexor 46 and a second set of lines 34b which is coupled to a programmable read only memory (PROM) 48 having an output bus 50 coupled to multiplexor 46 and output lines 51, 52 which provide the input to the two to four decoder 54. Output lines 56, 57 and 58 of decoder 54 are coupled to the write input control of memory banks 40, 41 and 42 respectively permitting the MPU to address individually each of the memory banks for the purpose of writing data in the various memory storage locations. PROM 48 contains two sets of data fields (lookup tables) which determine the horizontal image position depending upon which is selected by flip-flop 38. If one lookup table is selected, the image will appear in a normal left to right position; and if the other lookup table is selected the image will appear horizontally transposed right to left. This horizontal transposition is described in detail below.

The microprocessor by means of the game program or software generates a plurality of image data words on the data bus 32 which are stored in separate memory locations within the memory banks which are random access memories (RAMs). The microprocessor generates a data word for each of the pixels on the screen of the CRT. The image memory may be conceptualized as a grid of horizontal and vertical storage locations which correspond to horizontally scanned lines on the screen of the CRT and to vertical columns of pixels, respectively, wherein each memory address consists of a separate row address and column address which define a location in the image memory that corresponds to a location on the screen. The microprocessor addresses the desired memory location by address bus 34 which provides an address to multiplexor 46 as defined by lines 34a and 50. The output of the multiplexor is an address bus 60 which is coupled in parallel to each of memory banks 40-42. One of the memory banks is enabled as selected by decoder 54 so that the data word carried on data bus 32 is written into the specific memory location addressed by address bus 60. The data words stored within memory banks 40-42, for any given moment in time, define the picture image to be displayed on the screen. The video scan section 12 includes a video address counter 62 having a clock input provided by master clock 36 and having an output address bus 64 which is divided into one set of lines 64a directly coupled to multiplexor 46 and another set of lines 64b coupled to PROM 66. This PROM is similar to PROM 48 in that it includes two lookup tables which determine the vertical orientation of the displayed image dependent upon which table is selected by flip-flop 38. One of the lookup tables in PROM 66 will cause a normal vertical image to be displayed and the other lookup table will cause a vertical (bottom to top) inversion of the image. The output 68 of PROM 66 together with line 64a define an address which is coupled to multiplexor 46. As driven by master clock 36, multiplexor 46 alternates between coupling microprocessor generated addresses and video address counter generated addresses to the memory banks via address bus 60. The video address counter 62 generates a series of different addresses which completely scan each of the memory locations within memory banks 40-42.

The data in the memory banks 40, 41 and 42 as addressed by video address counter 62 is provided on output buses 40a, 41a and 42a, respectively, which define a parallel output bus 70 that is coupled to shift register 72. The shift register 72 as driven by master clock 36 couples the data on bus 72 to multiplexor 76 in sequential groups of four bit words via lines 74. Color ram 44 consists of a lookup table having data generated by MPU 30 and stored in separate memory locations. The data locations are addressed by the output lines 78 of multiplexor 76 which couples either the output information of shift register 72 or an address coupled to the multiplexor from MPU address bus 34. When the MPU address is coupled by multiplexor to the color ram, the MPU can write or rewrite data stored in the particular address location. When the multiplexor couples the output of shift register 72 to the color ram, the data which is addressed is coupled by the parallel output bus 44a of the color ram to a color control circuit 80 which produces analog output voltages which determines the color intensity of each of the red, blue and green color guns of a color CRT therein defining the color and saturation of a given pixel. The function and operation of color ram 44 and pixel color control 80 does not comprise a part of this invention and is provided only to facilitate an understanding of the present invention. U.S. Pat. application Ser. No. 309,524 entitled Method And Apparatus For Controlling The Color Of Images Displayed By A CRT, which is assigned to the same assignee as the present invention, describes in further detail the operation of color ram 44 and pixel color control 80 and is incorporated herein by reference.

It is an important aspect of the present invention that either the horizontal or vertical inversion of the picture image is controlled by the microprocessor section and that the other inversion of the image is controlled by the video scan section. Microprocessor 30 is "blind" to the inversion, that is, the microprocessor utilizes the same software to generate the same picture image regardless of whether the image is to be displayed in a normal or inverted perspective. This is very important since it permits changes in the software to be made much easier than would be the case if the software was used to directly generate both the normal and inverted images.

Operation

Operation of the MPU 30 and video address counter 62 are the same regardless of whether the image is being displayed normal or inverted. The horizontal inversion of the picture image is accomplished by PROM 48 which causes the image words to be stored in image memory 24 in horizontally transposed locations, that is, the image data for each horizontal line is stored from right to left instead of the normal left to right sequence. The address generated by the MPU is of a format in which the bits which determine horizontal position are carried by bus lines 34b and bits which determine the vertical position within the memory are carryed by bus lines 34a. It will be apparent from FIG. 2 that only the bits which determine the horizontal position are coupled from PROM 48 to multiplexor 46 by output lines 50. For a normal display a table within PROM 48 is addressed by bus lines 34b and the data stored therein coupled to the multiplexor on data lines 50. For an inverted image, a different table in PROM 48, as selected by flip-flop 38, is utilized to provide the data to the multiplexor; this data is preferably the complement of the data that would be carried on line 50 for the normal or noninverted image. It appears from the MPU's perspective that it is always entering image words into the image memory in the same format. However, it is actually entering data in either a left to right or right to left format as determined by which table in PROM 48 is being utilized. Therefore, for an inverted image, the image memory 24 contains image words written in a format in which only the horizontal transposition has been made. The vertical inversion is accomplished in the video scan section 12 as is explained below.

Video address counter 62 is a free-running parallel output binary counter driven by master clock 36 which counts from zero to a preselected value, is reset to zero, and continues periodically recycling in this manner. Address bus 64 contains address words which are incremented to periodically scan each image word location in the image memory 24. The bits of the address word carried by bus 64 which defines the vertical address location in the image memory are carried by lines 64b while the horizontally determinative bits are carried by bus lines 64a. The vertical determining bits 64b form an address to one of two lookup tables in PROM 66 as selected by flip-flop 38. For a normally displayed image one table in PROM 66 is selected. For an inverted display, the other table in PROM 66 is utilized to preferably produce the complement of the data which would have been produced on bus 68 in the normal image format. Thus, in the inverted mode the image memory 24 is scanned in the same horizontal format but in an inverted top to bottom vertical format. No change in the horizontal address locations is caused by the video address counter since the horizontal determinative bits carried by bus lines 64a are coupled directly to the multiplexor 46.

Thus, an inverted image is generated in two independent and separate steps. First, the MPU writes the image words into the image memory in a horizontally inverted but vertically normal format. Then the video address counter scans the image memory in a normal horizontal format but in an inverted vertical format.

The combined effect of these two steps produces a picture image on a pixel by pixel basis which is inverted. For example, if the left-most pixel on the upper-most line from player A's perspective was inverted, the image word representing that pixel would be stored in the right-most position in the upper-most line due to the computer control section 12 and read as though it was in the lower-most line (bottom) by the video scan section 10 so that the image presented to player B is the same as presented to player A in the normal mode.

The operation of a video game utilizing the above display system begins with players A and B initiating the game. A playfield is displayed for player A who takes his turn. Upon the occurrence of an event as determined by the game program, player A's turn ends and the MPU sets flip-flop 38 causing the other lookup table in PROMs 48 and 66 to be selected. The MPU rewrites the image memory in inverted horizontal order and the video scanning section reads the data stored in the image memory in inverted vertical order so that the playfield presented to player B at the beginning of his turn is properly oriented for him. At the end of player B's turn, the MPU resets the flip-flop causing the alternate lookup tables to be selected. The MPU rewrites the image memory in normal horizontal order and the video scanning section reads the memory in normal vertical order so that the playfield is again displayed oriented for player A and his next turn begins.

The blocks indicated in FIG. 2 are commercially available components: the MPU can be a Motorola type 6809E; the video address counter may comprise type 9316's; PROMs 48 and 66 may each be a HM 7641; multiplexor 46 may comprise 74153; the decoder coder 54 may be a 74139; each of the memory banks may comprise 4116's; shift register may be a 74165.

Although a PROM having two selectable lookup tables was utilized in the computer control section and in the vertical scan section, it will be apparent to those skilled in the art that other equivalent means could be utilized to provide the selectable complement of the horizontal determining bits in the computer control section and the complement of the vertical determinative bits in the video address section. For example, a multiplexor or tri-state buffers could be utilized to provide the complement of these bits. By complement is meant that a binary one to zero and zero to one conversion occurs.

Although an embodiment of the present invention has been described above and illustrated in the drawings, the scope of the present invention is defined by the claims appended hereto.

That which is claimed is:

1. In a video display system including a computer, a CRT, and means for displaying images which may include graphic displays on said CRT under control of said computer including an image memory which receives image data including graphic display data from the computer for subsequent display on said CRT, the image memory comprising a pixel memory map of the image to be display on the CRT, the improvement comprising means for writing the image data into said image memory in one of two selectable modes, namely, left to right or right to left; the means for writing including address generating means and first address memory means operatively disposed between the address generating means and the image memory, the first address memory means having selectable first and second address spaces, said first and second address spaces adapted to access the image memory, respectively, from left to right and right to left writing modes; means for reading the image data from said image memory for subsequent display on said CRT in one of two selectable modes, namely, top to bottom or bottom to top, the means for reading including said address generating means and second address memory means operatively disposed between the address generating means and the image memory, the second address memory means having selectable third and forth address spaces, said third and forth address spaces adapted to access the image memory, respectively, from top to bottom and bottom to top; and means operatively connected to said first and second address memory means for controlling said writing and reading means whereby the image displayed on said CRT may be normal, inverted or partially inverted when viewed from a fixed position.

2. The system according to claim 1 wherein said first address generating means comprises a first read only memory containing two sets of data which define two lookup tables.

3. The system according to claim 1 wherein said second address generating means comprises a first read only memory containing two sets of data which define two lookup tables, each table as selected by said controlling means corresponding to one of the two selectable modes of said reading means.

4. The system according to claim 1 wherein said controlling means comprises a flip-flop which is set and reset by said computer.

5. The system according to claim 1 wherein said reading means further includes a scanning means for periodically generating an address for each data storage location in said image memory.

6. The system according to claim 5 wherein said scanning means comprises a binary counter and a clock for periodically incrementing said counter.

7. The system according to claim 1 further comprising a multiplexor for coupling addresses to said image memory.

* * * * *